United States Patent
Ettinger et al.

(10) Patent No.: US 12,195,013 B2
(45) Date of Patent: Jan. 14, 2025

(54) EVALUATING MULTI-MODAL TRAJECTORY PREDICTIONS FOR AUTONOMOUS DRIVING

(71) Applicant: Waymo LLC, Mountain View, CA (US)

(72) Inventors: Scott Morgan Ettinger, San Carlos, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 280 days.

(21) Appl. No.: 17/691,058

(22) Filed: Mar. 9, 2022

(65) Prior Publication Data
US 2022/0289209 A1    Sep. 15, 2022

Related U.S. Application Data

(60) Provisional application No. 63/158,836, filed on Mar. 9, 2021.

(51) Int. Cl.
*B60W 50/00*    (2006.01)
*B60W 60/00*    (2020.01)
*G06N 20/00*    (2019.01)

(52) U.S. Cl.
CPC .... *B60W 50/0097* (2013.01); *B60W 60/0027* (2020.02); *G06N 20/00* (2019.01)

(58) Field of Classification Search
CPC .......... B60W 50/0097; B60W 60/0027; G06N 20/00; G06N 3/02
See application file for complete search history.

(56) References Cited

U.S. PATENT DOCUMENTS

| | | | |
|---|---|---|---|
| 2018/0300641 A1* | 10/2018 | Dong | G06N 20/00 |
| 2019/0204088 A1* | 7/2019 | Haque | G06N 3/02 |
| 2020/0298891 A1* | 9/2020 | Liang | G06V 10/82 |
| 2021/0181754 A1* | 6/2021 | Cui | G06N 3/084 |
| 2021/0276594 A1* | 9/2021 | Oh | H04W 4/44 |
| 2021/0358250 A1* | 11/2021 | Venetianer | G07C 9/37 |
| 2023/0012531 A1* | 1/2023 | Lim | B60W 60/001 |

OTHER PUBLICATIONS

Medium.com [online], "mAP (mean Average Precision) for Object Detection," Mar. 6, 2018, retrieved on May 21, 2012, retrieved from URL<https://jonathan-hui.medium.com/map-mean-average-precision-for-object-detection-45c121a31173/>, 13 pages.
Pascal et al., "A comprehensive review of deep learning in colon cancer," Computers in Biology and Medicine, Sep. 17, 2020, 126:104003.

* cited by examiner

*Primary Examiner* — Rami Khatib
(74) *Attorney, Agent, or Firm* — Fish & Richardson P.C.

(57) ABSTRACT

Methods, systems, and apparatus, including computer programs encoded on computer storage media, for evaluating a behavior prediction system.

20 Claims, 4 Drawing Sheets

EVALUATING MULTI-MODAL TRAJECTORY PREDICTIONS FOR AUTONOMOUS DRIVING

CROSS-REFERENCE TO RELATED APPLICATION

This application claims the benefit of U.S. Provisional Application No. 63/158,836, filed on Mar. 9, 2021. The disclosure of the prior application is considered part of and is incorporated by reference in the disclosure of this application.

BACKGROUND

This specification relates to predicting the future trajectory of an agent in an environment.

The environment may be a real-world environment, and the agent may be, e.g., a vehicle in the environment. Predicting the future trajectories of agents is a task required for motion planning, e.g., by an autonomous vehicle.

Autonomous vehicles include self-driving cars, boats, and aircraft.

SUMMARY

This specification generally describes a system implemented as computer programs on one or more computers in one or more locations that evaluates the behavior predictions generated by a behavior prediction system.

The subject matter described in this specification can be implemented in particular embodiments so as to realize one or more of the following advantages.

Behavior prediction systems that can make accurate behavior predictions for agents in the vicinity of an autonomous vehicle are an important component of the control system for the autonomous vehicle. However, behavior prediction systems have been difficult to evaluate without computationally expensive simulation or deployment on-board the vehicle. In particular, existing evaluation metrics are ill-suited to measuring the quality of the multi-modal behavior predictions that behavior prediction systems generate. This specification describes evaluating behavior prediction systems using evaluation data to allow the quality of the predictions generated by a behavior prediction system to be accurately evaluated without requiring simulation or on-board deployment. More specifically, this specification describes evaluating behavior prediction systems by computing an evaluation metric that is specifically tailored to the multi-modal trajectory predictions that are required for autonomous driving scenarios. In particular, the metric is a mean average precision (mAP)-based metric that takes into consideration the quality of predictions generated for multiple different trajectory shapes. This ensures that the computed metric accurately represents the quality of the behavior prediction systems across the many different types of behaviors exhibited by vehicles, agents, or other objects that are encountered by an autonomous vehicle during navigation. Because of this, the metric can be effectively used to, e.g., determine whether to deploy a given behavior prediction system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as a "behavior prediction system," to generate a respective trajectory prediction for each of one or more surrounding agents in the vicinity of the vehicle in an environment.

In this specification, a "surrounding agent" can refer, without loss of generality, to a vehicle, bicycle, pedestrian, ship, drone, or any other moving object in an environment.

This specification also describes how training examples generated by vehicles can be used to effectively train the behavior prediction system to accurately and reliably make predictions.

More specifically, this specification describes how the performance of a behavior prediction system can be evaluated, e.g., prior to the behavior prediction system being deployed on-board an autonomous vehicle.

Figure 1:
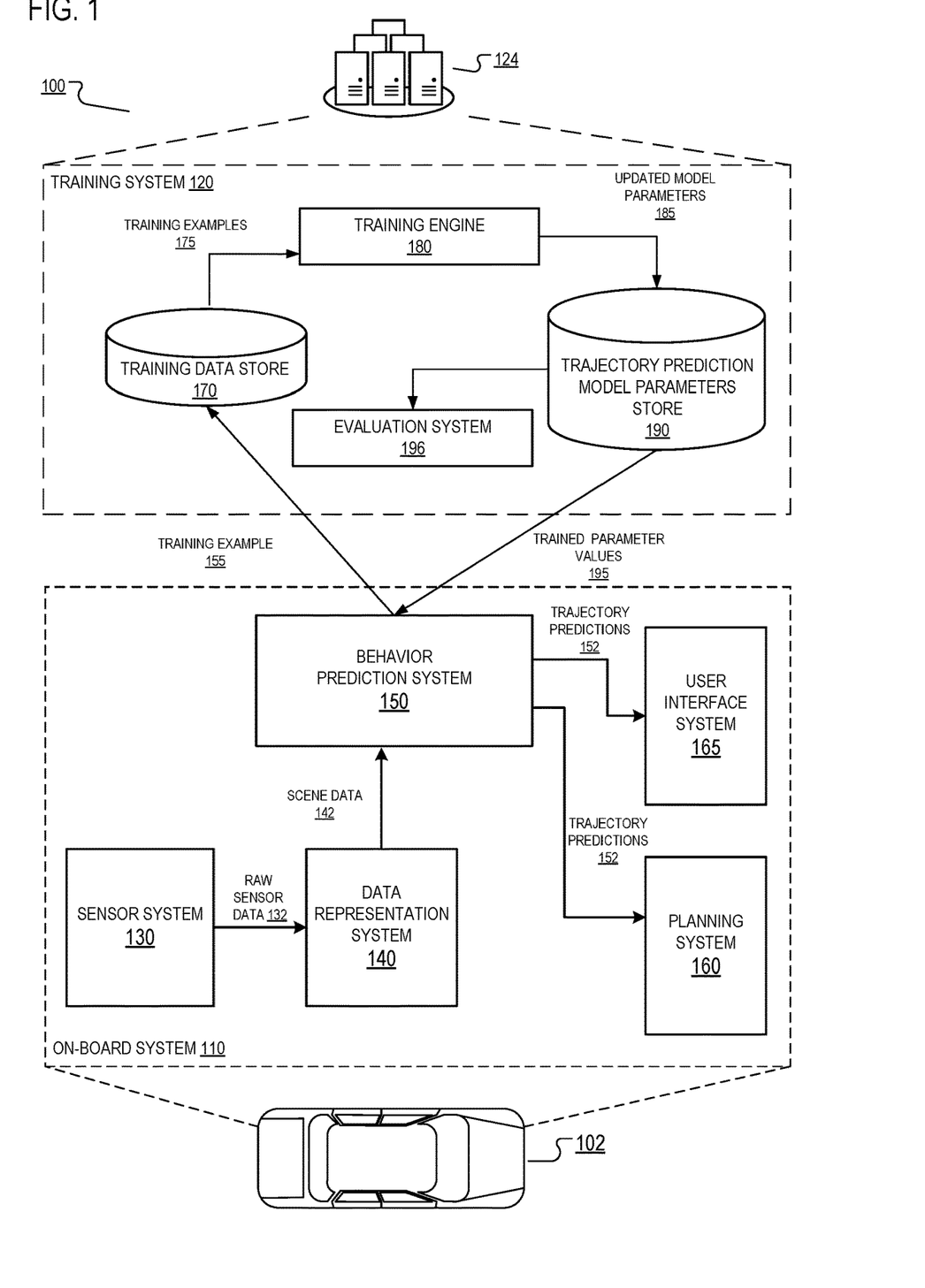
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and other data characterizing the environment, e.g., map data that identifies map features in the vicinity of the vehicle, and generates scene data 142. The scene data 142 characterizes the current state of the environment surrounding the vehicle 102 as of the current time point.

In particular, the scene data 142 includes at least (i) data characterizing observed trajectories for each of one or more agents in an environment, i.e., observed trajectories for one or more of the surrounding agents, and (ii) road graph data characterizing map features of a map of the environment. The data characterizing the observed trajectories can include data specifying the location of the corresponding surrounding agent at the current time step and one or more time steps that precede the time step. The data can optionally also include other information, e.g., the heading of the agent, the velocity of the agent, the type of the agent, and so on. Map features can include lane boundaries, crosswalks, stoplights, road signs, speed bumps, and other types of road features.

The data representation system 140 provides the scene data 142 to a behavior prediction system 150, also on-board the vehicle 102. The scene data 142 can be in any appropriate format and, more specifically, is in the same format as inputs to the behavior prediction system 150. For example, some behavior prediction systems operate on raw sensor data, e.g., images or point clouds. As another example, some behavior prediction systems operate on structured data, e.g., vectors or other tensors representing each of the plurality of agents and optionally the road graph. As yet another example, some behavior prediction systems operate on rendered images that show the agent states and the road graph in a specified format.

The behavior prediction system 150 processes the scene data 142 to generate a respective behavior prediction output 152 for each of one or more of the surrounding agents. The behavior prediction output 152 for a given agent characterizes the predicted future trajectory of the agent after the current time point.

More specifically, the behavior prediction system 150 generates, for a given agent at a given time, a multi-modal behavior prediction that assigns respective likelihoods ("confidences") to multiple future trajectories for the agent.

For example, the behavior prediction output 152 for a given agent can define a probability distribution over possible future trajectories for the given agent. As a particular example, the behavior prediction output 152 for a given agent can include data characterizing a predicted similarity of the future trajectory of the agent to each of a plurality of anchor trajectories, e.g., a respective probability for each of the future trajectories that represents the likelihood that the agent will adopt the trajectory. Each anchor trajectory characterizes a different possible future trajectory of the agent after the current time point and includes data specifying a sequence of multiple waypoint spatial locations in the environment that each correspond to a possible position of the agent at a respective future time point that is after the future time point. In other words, each anchor trajectory identifies a different sequence of waypoint locations in the environment that may be traversed by the surrounding agent after the current time point.

In some of these examples, the behavior prediction output 152 for the given agent also includes, for each anchor trajectory, data defining, for each waypoint spatial location of the anchor trajectory, a probability distribution dependent on the waypoint spatial location. The probability distribution for a given waypoint spatial location defines respective likelihoods that the agent will occupy respective spatial positions in a vicinity of the waypoint spatial location at the future time point corresponding to the waypoint spatial location. That is, given that the agent follows the anchor trajectory, the probability distribution represents the space of predicted possible deviations from the anchor trajectory of the agent's actual future trajectory. In other words, for a given anchor trajectory, the probability distribution at a given future time point represents the space of possible deviations of the agent from the waypoint spatial location in the given anchor trajectory, with locations assigned higher probabilities being more likely deviations than locations assigned lower probabilities.

The behavior prediction system 150 can be any appropriate machine learning model that has been trained using an appropriate training technique. For example, the system 150 can be a neural network that has an architecture that maps scene data to a behavior prediction output. Examples of such neural network architectures include the MultiPath architecture, the MultiPath++ architecture, the Scene Transformer architecture, the Target-driven Trajectory Prediction architecture, and so on.

In some implementations, the behavior prediction system 150 generates trajectory predictions for one target agent at a time. That is, to generate a prediction for a given target agent, the system 150 can project the agent trajectories and, optionally, the road graph data in the scene data into an agent-centric coordinate frame for the target agent and then generates the trajectory prediction for the target agent.

In some other implementations, the behavior prediction system 150 can generate trajectory predictions for multiple target agents at a time. That is, to generate a prediction for a given set of target agents, the system 150 can process the scene data in a scene-centric coordinate frame and generate the trajectory predictions for the target agents in parallel.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the behavior prediction outputs 152 generated by the behavior prediction system 150 to one or more other on-board systems of the vehicle 102, e.g., the planning system 160 and/or a user interface system 165.

When the planning system 160 receives the behavior prediction outputs 152, the planning system 160 can use the behavior prediction outputs 152 to generate planning decisions that plan a future trajectory of the vehicle, i.e., to generate a new planned vehicle path. For example, the behavior prediction outputs 152 may contain a prediction that a particular surrounding agent is likely to cut in front of the vehicle 102 at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the behavior prediction outputs 152, the user interface system 165 can use the behavior prediction outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the behavior prediction outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the behavior prediction outputs 152, the behavior prediction system 150 can use trained parameter values 195, i.e., trained model parameter values of the behavior prediction system 150, obtained from a trajectory prediction model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the behavior prediction system i.e., to determine the trained parameter values 195 of the behavior prediction system 150. The training data store 170 receives raw training examples from agents operating in the real world. For example, the training data store 170 can receive a raw training example 155 from the vehicle 102 and one or more other agents that are in communication with the training system 120. The raw training example 155 can be processed by the training system 120 to generate a new training example. The raw training example 155 can include scene data, i.e., like the scene data 142, that can be used as input for a new training example. The raw training example 155 can also include outcome data characterizing the state of the environment surrounding the vehicle 102 at the one or more future time points. This outcome data can be used to generate ground truth trajectories for one or more agents in the vicinity of the vehicle at the time point characterized by the scene data. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points.

The training data store 170 provides training examples 175 to a training engine 180, also hosted in the training system 120. The training engine 180 uses the training examples 175 to update model parameters that will be used by the behavior prediction system 150, and provides the updated model parameters 185 to the trajectory prediction model parameters store 190. The training engine 180 can train the behavior prediction system 150, i.e., update the model parameters, using any conventional machine learning technique, i.e., by minimizing a loss function using gradient-based machine learning techniques. Once the parameter values of the behavior prediction system 150 have been fully trained, the training system 120 can send the trained parameter values 195 to the behavior prediction system 150, e.g., through a wired or wireless connection.

The training system 120 also includes an evaluation system 196 that evaluates the performance of the behavior prediction system 150 after the system 150 is trained, i.e., using the trained parameter values 195.

In particular, the evaluation system 196 computes an evaluation metric that measures the quality of the multi-modal behavior predictions generated by the behavior prediction system 150 relative to ground truth trajectories for the corresponding agents.

Computing the metric is described in more detail below with reference to FIGS. 2-4.

In some implementations, the evaluation system 196 computes the metric prior to the behavior prediction system 150 being deployed on-board the vehicle 102, i.e., prior to the trained parameter values 195 being provided to the behavior prediction system 150 on-board the vehicle 102. In these implementations, the evaluation system 196 can determine to deploy the behavior prediction system 150 on-board the vehicle in response to certain criteria being satisfied, where at least one of the criteria is dependent on the value of the metric for the system 150.

Determining whether to deploy a behavior prediction system is described below with reference to FIG. 2.

Because the evaluation metric is particularly tailored for multi-modal behavior predictions, the system 196 can more effectively determine the quality of various behavior prediction systems and can make more accurate deployment decisions.

Figure 2:
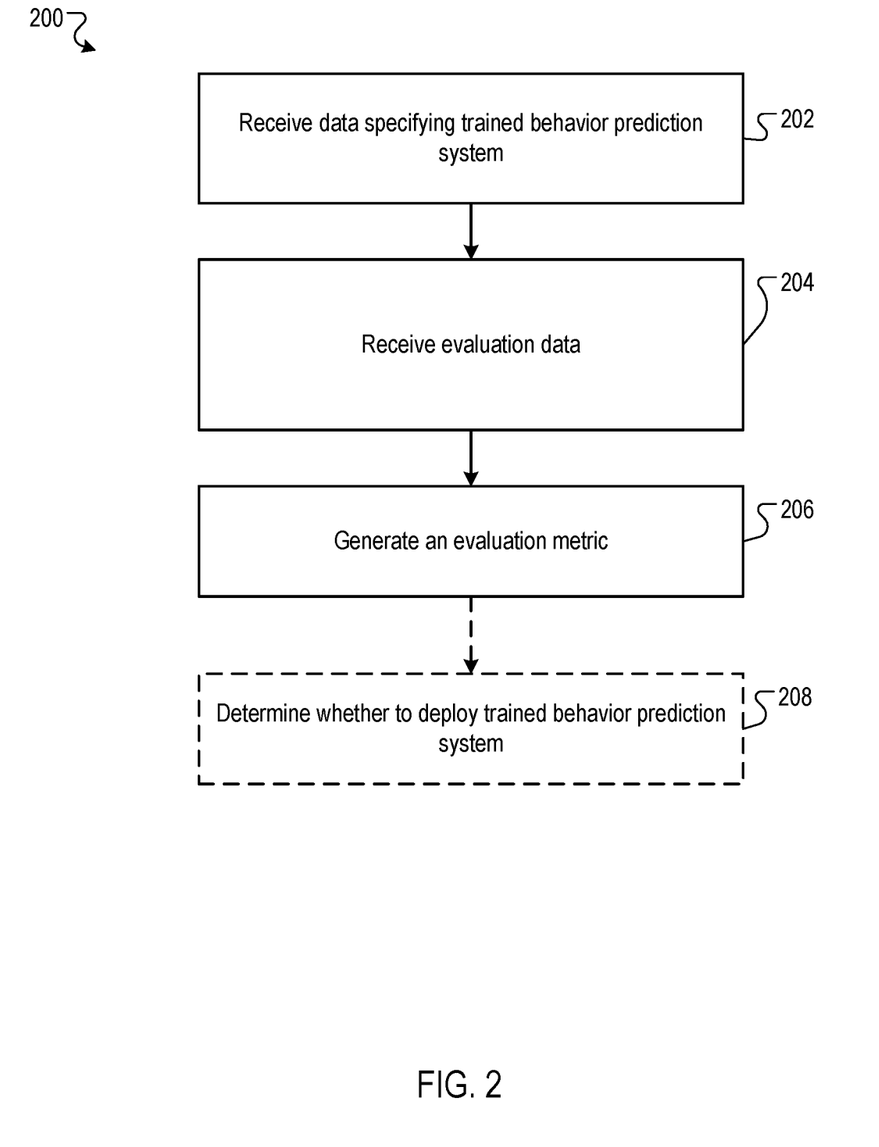
FIG. 2 is a flow diagram of an example process for evaluating a behavior prediction system.

FIG. 2 is a flow diagram of an example process 200 for evaluating a behavior prediction system. For convenience, the process 200 will be described as being performed by a system of one or more computers located in one or more locations. For example, a training system, e.g., the training system 120 of FIG. 1, appropriately programmed in accordance with this specification, can perform the process 200.

The system receives data specifying a behavior prediction system to be evaluated (step 302). As described above, the behavior prediction system can be any trained machine learning model that has been trained to generate multi-modal trajectory predictions.

That is, the behavior prediction system can be any behavior prediction system that generates, for a given agent at a given time, a multi-modal behavior prediction that assigns respective likelihoods ("confidences") to multiple future trajectories for the agent by processing any type of scene data characterizing the environment at the given time.

The system receives evaluation data (step 204). The evaluation data includes a set of training examples that include (i) scene data characterizing a scene in an environment at a corresponding time that includes a set of agents that, in turn, includes one or more target agents and (ii) a ground truth trajectory that represents an actual trajectory taken by each of the one or more target agents after the corresponding time. For example, the evaluation data can be a validation set of data that has been held out from the training data used to train the behavior prediction system.

The system generates an evaluation metric (step 206) that measures a quality of the multi-modal behavior predictions generated by the behavior prediction system relative to the corresponding ground truth trajectories for the training examples in the evaluation data. In particular, the evaluation metric is an average precision (AP)-based metric that accounts for the quality of the behavior predictions for multiple different trajectory shapes, i.e., that reflect multiple different plausible trajectory shapes that agents can adopt in the real-world.

Generally, the system processes the scene data in each training example using the behavior prediction system to generate a multi-modal trajectory prediction for the one or more target agents in the training example. That is, the system processes the scene data to obtain a plurality of future trajectories for each of the one or more target agents and a respective confidence for each of the future trajectories.

The system then computes the evaluation metric from the ground truth trajectories for the target agents in the training examples in the evaluation data and the multi-modal trajectory predictions for the target agents in the training examples.

Computing the evaluation metric is described below with reference to FIG. 3.

Once the system has generated the evaluation metric, the system can optionally determine whether to deploy the behavior prediction system based at least in part on the value of the metric for the behavior prediction system.

For example, the system can determine whether to deploy the behavior prediction system on-board an autonomous vehicle for use in making behavior predictions that will be used by the planning system of the autonomous vehicle to make planning decisions as described above.

As another example, the system can determine whether to deploy the behavior prediction system in a simulation of the real-world environment for use in controlling a simulated version of the autonomous vehicle, i.e., in order to test the behavior prediction system prior to deploying the behavior prediction system on-board the autonomous vehicle. Computer simulation is a computationally intensive process, requiring many processor cycles and a significant amount of memory consumption in order to accurately model real-world driving scenarios. Thus, using the evaluation metric to determine to test only behavior prediction systems that are likely to perform well after training can save significant computational resources by eliminating the need to test systems that are unlikely to perform well in simulation or in the real-world.

For example, the system can determine whether to deploy the behavior prediction system only when the evaluation metric for the behavior prediction system exceeds a threshold value.

As another example, the system can determine whether to deploy the behavior prediction system only when the evaluation metric for the behavior prediction system exceeds the evaluation metric for another behavior prediction system by at least a threshold value. For example, the other behavior prediction system can be the system that is currently deployed on-board the autonomous vehicle or the behavior prediction system that has the highest metric of any behavior prediction system for which an evaluation metric has previously been computed.

As yet another example, the system can determine to deploy the behavior prediction system only when one of the above criteria has been satisfied and one or more additional criteria are satisfied, e.g., one or more criteria for scores for other types of evaluation metric, one or more criteria for prediction latency, and so on.

In response to determining to deploy the behavior prediction system, the system can deploy the behavior prediction system, e.g., on-board the autonomous vehicle or in simulation.

Figure 3:
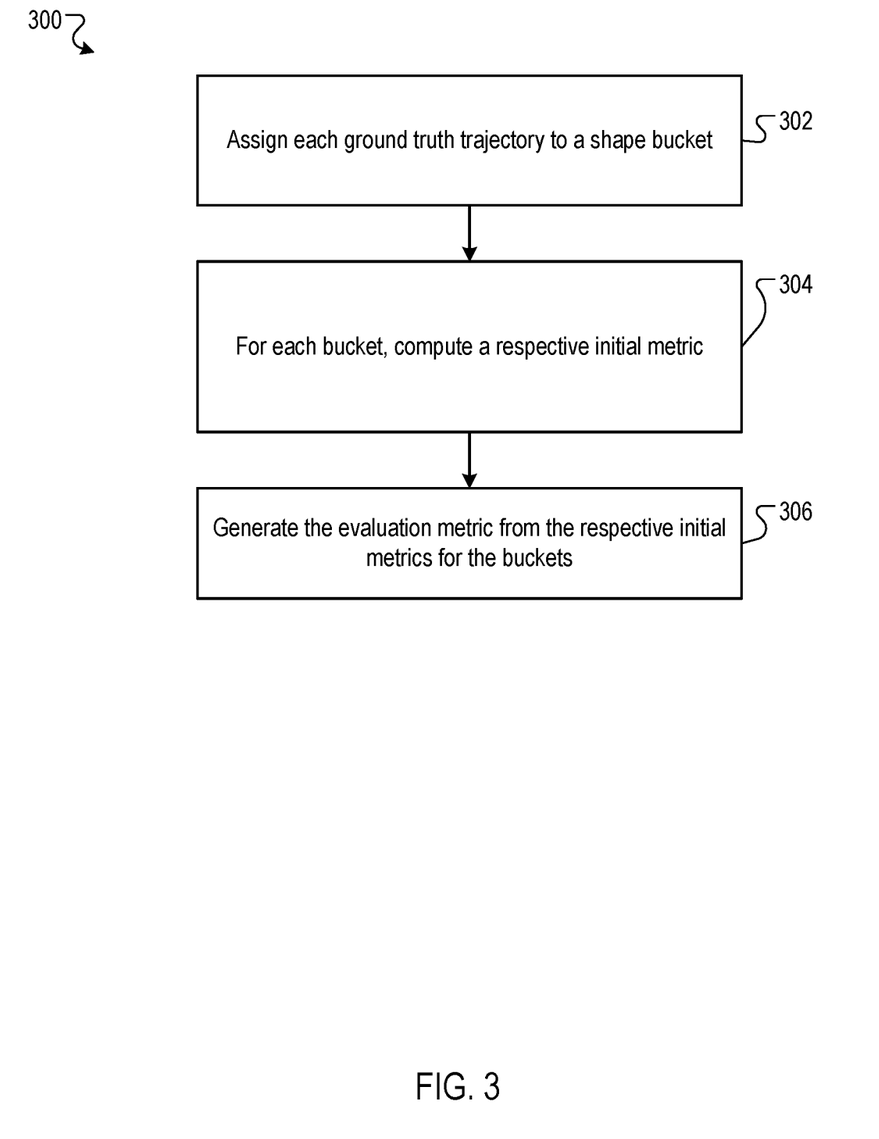
FIG. 3 is a flow diagram of an example process for generating an evaluation metric.

FIG. 3 is a flow diagram of an example process 300 for generating an evaluation metric for the behavior prediction system. For convenience, the process 300 will be described as being performed by a system of one or more computers located in one or more locations. For example, a training system, e.g., the training system 152 of FIG. 1, appropriately programmed in accordance with this specification, can perform the process 300.

The system assigns each of the ground truth trajectories in the training examples to a respective one of a plurality of trajectory shape buckets (step 302). That is, the system maintains data specifying a plurality of buckets, each bucket corresponding to a different one of a predetermined set of trajectory shapes. For example, the buckets can include trajectories that travel any one of: straight, straight-left, straight-right, left, right, left u-turn, right u-turn, and stationary. The system can assign a ground truth trajectory to a shape bucket based on, e.g., the similarity between predetermined canonical trajectories for the shape buckets and the ground truth trajectory. As a particular example, the system can assign the ground truth trajectory to the shape bucket that has a canonical trajectory with a final waypoint that is the closest to the final waypoint in the ground truth trajectory.

For each bucket, the system computes, from the multi-modal behavior predictions and the ground truth trajectories, a respective initial AP-based metric (step 304).

To compute an initial metric for any given bucket, the system identifies true positive future trajectories and false positive future trajectories for the bucket.

To identify these trajectories for a given ground truth trajectory that is in the given bucket, the system determines, for each given ground truth trajectory, whether any of the predicted trajectories in the corresponding multi-modal behavior prediction match the ground truth trajectory.

The system can determine whether a given trajectory matches the ground truth trajectory based on a similarity between the states in the ground truth trajectory and the corresponding states in the trajectory.

As a particular example, the system can determine that a given trajectory matches the ground truth trajectory if the last waypoint location in the given trajectory is within a lateral threshold and a longitudinal threshold of the last waypoint location in the ground truth trajectory. In some cases, these thresholds are fixed to predetermined values. In other cases, the system determines the lateral and longitudinal thresholds adaptively based on the agent. For example, the system can determine a respective initial lateral and longitudinal threshold based on the time offset between the final time in the ground truth trajectory and the initial time in the ground truth trajectory and then scale the initial thresholds based on the initial speed of the target agent at the outset of the ground truth trajectory, i.e., where the scale factor is higher the higher the initial speed of the target agent.

If none of the predicted trajectories match the ground truth trajectory, the system designates all of the predicted trajectories as false positives.

If any of the predicted trajectories match the ground truth trajectory, the system designates the highest-confidence matching trajectory as a true positive and all of the non-matching trajectories as false positive.

Generally, if multiple trajectories match the ground truth trajectory, the system designates only the highest-confidence matching trajectory as a true positive. In some implementations, the other, lower-confidence matching trajectories are designated as false positives. In some other implementations (also referred to as "soft" versions of the metric), the other, lower-confidence matching trajectories are disregarded and not designated as either true or false positives.

The system then determines, from the identified true positive future trajectories and false positive future trajectories for the bucket and the confidences assigned to the identified true positive future trajectories and false positive future trajectories, the respective initial metric for the bucket.

Once the true and false positives are determined for a given bucket, the system can sort the true and false positive trajectories by their confidences and compute the initial metric for each bucket as the area under a precision-recall curve for the bucket, with each point on the curve being computed at a respective confidence score threshold.

The point on the curve for a given confidence score threshold represents (i) the precision of the trajectory predictions if only trajectories having confidences at least equal to the threshold are counted as false positives and true positives and (ii) the recall of the trajectory predictions if only trajectories having confidences at least equal to the threshold are counted as false positives and true positives. The precision of the trajectory predictions is the ratio of true positives having a confidence score at least equal to the threshold to the sum of true positives and false positives having confidence scores at least equal to the threshold. The recall of the trajectory predictions is the ratio of true positives having a confidence score at least equal to the threshold to the total number of ground truth trajectories assigned to the bucket.

In some cases, the system uses interpolated precision values when computing the area under the curve. When using interpolated precision values, at each recall level, the system replaces the precision value with the maximum precision value to the right of that recall level on the curve.

The system computes the evaluation metric from the respective initial AP-based metrics for the buckets (step 306). For example, the system can combine the initial metrics for the buckets by averaging the metrics or by computing a weighted sum of the metrics (e.g., with weights being assigned based on how many ground truth trajectories are in each bucket).

Figure 4:
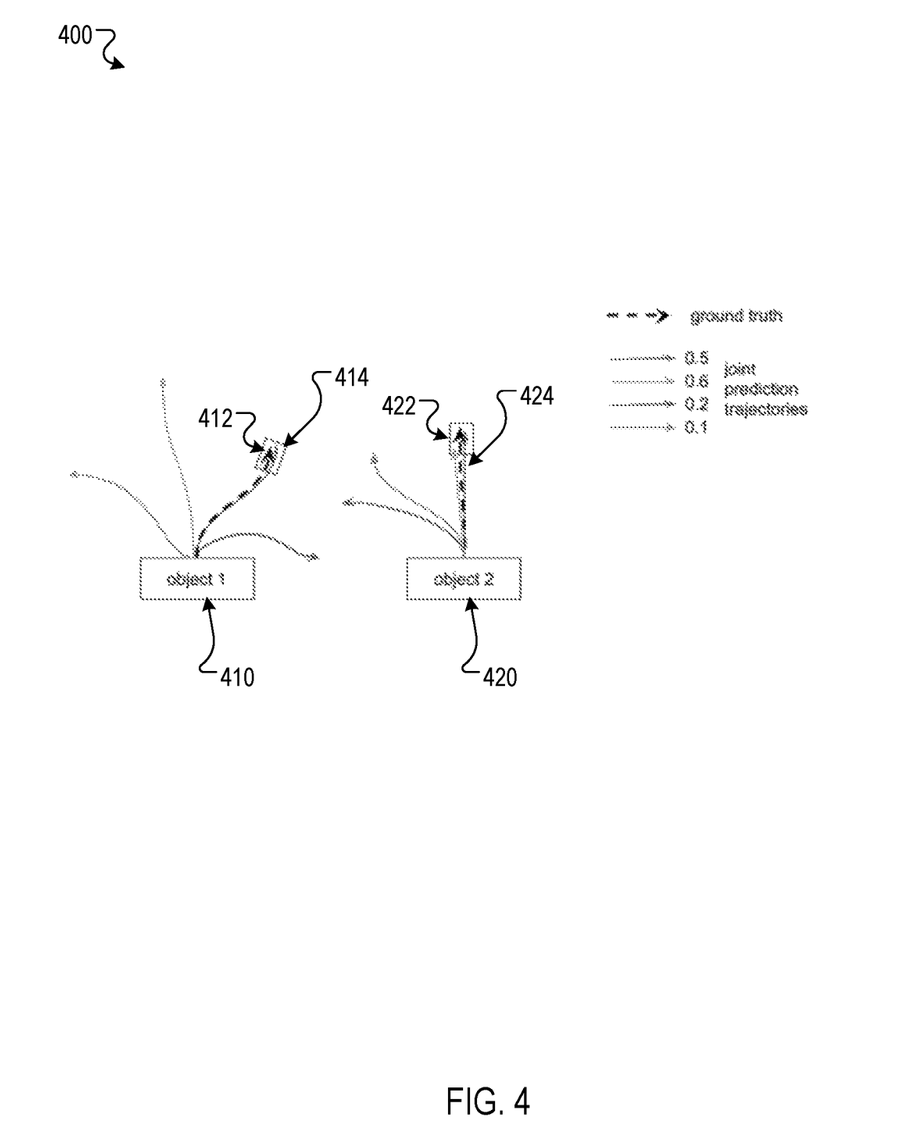
FIG. 4 shows an example of calculating the evaluation metric for two multi-modal behavior predictions for two objects.

FIG. 4 shows an example of calculating the evaluation metric for two multi-modal behavior predictions for two objects, i.e., object 1 410 and object 2 420.

The multi-modal behavior predictions for each object include four predicted trajectories and a respective confidence score for each predicted trajectory. FIG. 4 also shows the ground truth trajectories 412 and 422 for object 1 and object 2, respectively.

As shown in FIG. 4, for object 1 410, only a trajectory 414 that has a confidence of 0.5 is a match for the ground truth trajectory 412.

Thus, the trajectory 414 is designated as a true positive and the other three trajectories are identified as false positives.

For object 2 420, only a trajectory 424 that has a confidence of 0.5 is a match for the ground truth trajectory 422.

Thus, the trajectory 424 is designated as a true positive and the other three trajectories are identified as false positives.

In some implementations, if another, lower-scoring trajectory had also been a match for the ground truth trajectory 422 but had a lower confidence score than 0.5, the other trajectory would also be designated a false positive because, although it matches the ground truth trajectory 422, it is not the highest-confidence matching trajectory. In some other implementations, i.e., in the "soft" version of the evaluation metric, the other trajectory would be disregarded and not designated as either a false positive or a true positive. This avoids penalizing the behavior prediction system for generating additional plausible future trajectories that match the ground truth trajectory.

Once the true and false positives are determined, the system can sort the true and false positive trajectories by their confidences and compute the initial metric for the given bucket as the area under the precision-recall curve as described above, with each point on the curve being computed at a given confidence score threshold. In some cases, the system uses interpolated precision values when computing the area under the curve.

Table 1, below, shows an example of the points on the curve when the two predictions shown in FIG. 4 are the only predictions for a given bucket.

| Rank (confidence scores) | Precision | Recall |
|---|---|---|
| .6 | 0% | 0% |
| .5 | 50% | 100% |
| .2 | 33.3% | 100% |
| .1 | 25% | 100% |

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
    generating, using a behavior prediction system, a plurality of multi-modal behavior predictions generated by a behavior prediction system based on processing scene data characterizing an environment as input, wherein each multi-modal behavior prediction corresponds to a respective agent of one or more agents at a respective time and assigns a respective confidence to each of a plurality of future trajectories that can be taken by the respective agent after the respective time;
    receiving, for each of the plurality of multi-modal behavior predictions, a respective ground truth trajectory that represents an actual trajectory taken by the respective agent after the respective time;
    generating an average precision (AP)-based metric that measures a quality of the multi-modal behavior predictions relative to the corresponding ground truth trajectories, the generating comprising:
        assigning each of the corresponding ground truth trajectories to a respective one of the plurality of trajectory shape buckets;
        computing, from the multi-modal behavior predictions and the ground truth trajectories, a respective initial AP-based metric for each of a plurality of trajectory shape buckets; and
        computing the AP-based metric from the respective initial AP-based metrics for the buckets; and
    deploying the behavior prediction system on-board an autonomous vehicle for controlling the autonomous vehicle based at least in part on the AP-based metric.

2. The method of claim 1, wherein computing the AP-based metric from the respective initial AP-based metrics for the buckets comprises:
    averaging the respective initial AP-based metrics.

3. The method of claim 1, wherein for each bucket, computing, from the multi-modal behavior predictions and the ground truth trajectories, a respective initial AP-based metric comprises:
    for each bucket:
        identifying true positive future trajectories and false positive future trajectories for the bucket; and
        determining, from the identified true positive future trajectories and false positive future trajectories for the bucket and the confidences assigned to the identified true positive future trajectories and false positive future trajectories, the respective initial AP-based metric for the bucket.

4. The method of claim 3, wherein identifying true positive future trajectories and false positive future trajectories for the bucket comprises:
    for each ground truth trajectory that is assigned to the bucket:
        for each of the future trajectories in the multi-modal prediction for the ground truth trajectory, determining whether the future trajectory matches the ground truth trajectory; and
        designating each future trajectory that does not match the ground truth trajectory as a false positive.

5. The method of claim 4, wherein identifying true positive future trajectories and false positive future trajectories for the bucket further comprises:
    for each ground truth trajectory that is assigned to the bucket:
        designating a future trajectory that matches the ground truth trajectory and that has a highest confidence among future trajectories that match the ground truth trajectory as a true positive.

6. The method of claim 5, wherein identifying true positive future trajectories and false positive future trajectories for the bucket further comprises:
    for each ground truth trajectory that is assigned to the bucket:
        designating each future trajectory that matches the ground truth trajectory but that does not have a highest confidence among future trajectories that match the ground truth trajectory as false positives.

7. The method of claim 1, wherein deploying the behavior prediction system on-board an autonomous vehicle for controlling the autonomous vehicle comprises:
- determining based at least in part on the average precision (AP)-based metric for the behavior prediction system to deploy the behavior prediction system to make behavior predictions for controlling the autonomous vehicle; and
- in response to determining to deploy the behavior prediction system to make behavior predictions, deploying the behavior prediction system on-board the autonomous vehicle.

8. The method of claim 1, wherein the behavior prediction system is a machine learning model trained to map scene data to one or more multi-modal prediction outputs using trained parameter values, wherein the scene data comprises at least (i) data characterizing observed trajectories for each of one or more agents and (ii) road graph data characterizing map features of a map of an environment.

9. A system comprising one or more computers and one or more storage devices storing instructions that when executed by the one or more computers cause the one or more computers to perform operations comprising:
- generating, using a behavior prediction system, a plurality of multi-modal behavior predictions generated by a behavior prediction system based on processing scene data characterizing an environment as input, wherein each multi-modal behavior prediction corresponds to a respective agent of one or more agents at a respective time and assigns a respective confidence to each of a plurality of future trajectories that can be taken by the respective agent after the respective time;
- receiving, for each of the plurality of multi-modal behavior predictions, a respective ground truth trajectory that represents an actual trajectory taken by the respective agent after the respective time;
- generating an average precision (AP)-based metric that measures a quality of the multi-modal behavior predictions relative to the corresponding ground truth trajectories, the generating comprising:
  - assigning each of the corresponding ground truth trajectories to a respective one of the plurality of trajectory shape buckets;
  - computing, from the multi-modal behavior predictions and the ground truth trajectories, a respective initial AP-based metric for each of a plurality of trajectory shape buckets; and
  - computing the AP-based metric from the respective initial AP-based metrics for the buckets; and
- deploying the behavior prediction system on-board an autonomous vehicle for controlling the autonomous vehicle based on the AP-based metric.

10. The system of claim 9, wherein computing the AP-based metric from the respective initial AP-based metrics for the buckets comprises:
- averaging the respective initial AP-based metrics.

11. The system of claim 9, wherein for each bucket, computing, from the multi-modal behavior predictions and the ground truth trajectories, a respective initial AP-based metric comprises:
- for each bucket:
  - identifying true positive future trajectories and false positive future trajectories for the bucket; and
  - determining, from the identified true positive future trajectories and false positive future trajectories for the bucket and the confidences assigned to the identified true positive future trajectories and false positive future trajectories, the respective initial AP-based metric for the bucket.

12. The system of claim 11, wherein identifying true positive future trajectories and false positive future trajectories for the bucket comprises:
- for each ground truth trajectory that is assigned to the bucket:
  - for each of the future trajectories in the multi-modal prediction for the ground truth trajectory, determining whether the future trajectory matches the ground truth trajectory; and
  - designating each future trajectory that does not match the ground truth trajectory as a false positive.

13. The system of claim 12, wherein identifying true positive future trajectories and false positive future trajectories for the bucket further comprises:
- for each ground truth trajectory that is assigned to the bucket:
  - designating a future trajectory that matches the ground truth trajectory and that has a highest confidence among future trajectories that match the ground truth trajectory as a true positive.

14. The system of claim 13, wherein identifying true positive future trajectories and false positive future trajectories for the bucket further comprises:
- for each ground truth trajectory that is assigned to the bucket:
  - designating each future trajectory that matches the ground truth trajectory but that does not have a highest confidence among future trajectories that match the ground truth trajectory as false positives.

15. The system of claim 9, wherein deploying the behavior prediction system on-board an autonomous vehicle for controlling the autonomous vehicle comprises:
- determining based at least in part on the average precision (AP)-based metric for the behavior prediction system to deploy the behavior prediction system to make behavior predictions for controlling the autonomous vehicle; and
- in response to determining to deploy the behavior prediction system to make behavior predictions, deploying the behavior prediction system on-board the autonomous vehicle.

16. One or more non-transitory computer-readable storage media storing instructions that when executed by one or more computers cause the one or more computers to perform operations comprising:
- generating, using a behavior prediction system, a plurality of multi-modal behavior predictions generated by a behavior prediction system based on processing scene data characterizing an environment as input, each multi-modal behavior prediction corresponds to a respective agent of one or more agents at a respective time and assigns a respective confidence to each of a plurality of future trajectories that can be taken by the respective agent after the respective time;
- receiving, for each of the plurality of multi-modal behavior predictions, a respective ground truth trajectory that represents an actual trajectory taken by the respective agent after the respective time;
- generating an average precision (AP)-based metric that measures a quality of the multi-modal behavior predictions relative to the corresponding ground truth trajectories, the generating comprising:
  - assigning each of the corresponding ground truth trajectories to a respective one of the plurality of trajectory shape buckets;

computing, from the multi-modal behavior predictions and the ground truth trajectories, a respective initial AP-based metric; and computing the AP-based metric from the respective initial AP-based metrics for the buckets; and deploying the behavior prediction system on-board an autonomous vehicle for controlling the autonomous vehicle based on the AP-based metric.

17. The non-transitory computer-readable storage media of claim 16, wherein computing the AP-based metric from the respective initial AP-based metrics for the buckets comprises:

averaging the respective initial AP-based metrics.

18. The non-transitory computer-readable storage media of claim 16, wherein for each bucket, computing, from the multi-modal behavior predictions and the ground truth trajectories, a respective initial AP-based metric comprises:

for each bucket:
identifying true positive future trajectories and false positive future trajectories for the bucket; and
determining, from the identified true positive future trajectories and false positive future trajectories for the bucket and the confidences assigned to the identified true positive future trajectories and false positive future trajectories, the respective initial AP-based metric for the bucket.

19. The non-transitory computer-readable storage media of claim 18, wherein identifying true positive future trajectories and false positive future trajectories for the bucket comprises:

for each ground truth trajectory that is assigned to the bucket:
for each of the future trajectories in the multi-modal prediction for the ground truth trajectory, determining whether the future trajectory matches the ground truth trajectory; and
designating each future trajectory that does not match the ground truth trajectory as a false positive.

20. The non-transitory computer-readable storage media of claim 18, wherein identifying true positive future trajectories and false positive future trajectories for the bucket further comprises:

for each ground truth trajectory that is assigned to the bucket:
designating a future trajectory that matches the ground truth trajectory and that has a highest confidence among future trajectories that match the ground truth trajectory as a true positive.

* * * * *